(12) United States Patent
Bullard et al.

(10) Patent No.: US 8,171,169 B2
(45) Date of Patent: May 1, 2012

(54) METHOD AND APPARATUS FOR UPDATING A GRAPHICAL DISPLAY IN A DISTRIBUTED PROCESSING ENVIRONMENT

(75) Inventors: Justin Bullard, Wilton Manors, FL (US); Toby Opferman, Duvall, WA (US); David J. Kasik, Sammamish, WA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 836 days.

(21) Appl. No.: 10/906,954

(22) Filed: Mar. 14, 2005

(65) Prior Publication Data

US 2006/0206820 A1    Sep. 14, 2006

(51) Int. Cl.
G06F 15/16 (2006.01)
G06K 9/00 (2006.01)
G06K 9/36 (2006.01)
H04N 1/413 (2006.01)
H04N 1/41 (2006.01)

(52) U.S. Cl. ........ 709/247; 709/234; 709/236; 709/246; 382/162; 382/165; 382/166; 382/181; 382/232; 382/233; 382/235; 382/244; 382/245; 382/246; 382/247; 382/248; 382/250; 358/426.01; 358/426.13; 358/426.14; 341/50; 341/51; 370/465; 370/466; 370/467; 370/477

(58) Field of Classification Search .................. 709/234, 709/236, 246–247; 382/162, 165–166, 181, 382/232, 233, 235, 244, 245, 246, 247, 248, 382/250; 358/426.01, 426.13, 426.14; 341/50–51; 704/500, 269, 221, 219; 370/465–467, 477
See application file for complete search history.

(56) References Cited

U.S. PATENT DOCUMENTS

| 3,596,257 A | 7/1971 | Patel |
| 4,013,828 A | 3/1977 | Judice |
| 4,322,795 A | 3/1982 | Lange et al. |
| 4,395,754 A | 7/1983 | Feissel et al. |
| 4,410,916 A | 10/1983 | Pratt et al. |

(Continued)

FOREIGN PATENT DOCUMENTS

EP    0283735    9/1988

(Continued)

OTHER PUBLICATIONS

Amir Said et al., "An Image Multiresolution Representation for Lossless and Lossy Compression", IEEE Transactions on Image Processing, IEEE Service Center, 5(9): Sep. 1996.

(Continued)

*Primary Examiner* — Khanh Dinh
*Assistant Examiner* — Saket K Daftuar
(74) *Attorney, Agent, or Firm* — Foley and Lardner LLP; John D. Lanza

(57) ABSTRACT

A system and method for updating a display unit remotely located from a computing system are described. The method includes copying display information from a video buffer of a computing device executing an application to generate a display update, calculating a size of the display update, and determining an amount of available bandwidth of a network connecting the computing device and the display unit. The method also includes calculating a time period required to communicate the display update from the computing device to the display unit, transmitting the display update to the display; and repeating the method after the time period has elapsed.

14 Claims, 5 Drawing Sheets

U.S. PATENT DOCUMENTS

| | | | |
|---|---|---|---|
| 4,430,712 A | 2/1984 | Coulson et al. | |
| 4,463,424 A | 7/1984 | Mattson et al. | |
| 4,499,499 A | 2/1985 | Brickman et al. | |
| 4,503,501 A | 3/1985 | Coulson et al. | |
| 4,562,423 A | 12/1985 | Humblet | |
| 4,691,281 A | 9/1987 | Furui et al. | |
| 4,701,745 A | 10/1987 | Waterworth et al. | |
| 4,701,871 A | 10/1987 | Sasaki et al. | |
| RE32,632 E | 3/1988 | Atkinson | |
| 4,796,003 A | 1/1989 | Bentley et al. | |
| 4,807,029 A | 2/1989 | Tanaka et al. | |
| 4,860,247 A | 8/1989 | Uchida et al. | |
| 4,862,392 A | 8/1989 | Steiner | |
| 4,870,662 A | 9/1989 | Lindbergh et al. | |
| 4,899,149 A | 2/1990 | Kahan | |
| 4,903,218 A | 2/1990 | Longo et al. | |
| 4,905,141 A | 2/1990 | Brenza | |
| 4,928,247 A | 5/1990 | Doyle et al. | |
| 4,937,036 A | 6/1990 | Beard et al. | |
| 4,949,281 A | 8/1990 | Hillenbrand et al. | |
| 4,958,303 A | 9/1990 | Assarpour et al. | |
| 4,992,954 A | 2/1991 | Takeda et al. | |
| 5,001,478 A | 3/1991 | Nagy | |
| 5,016,009 A | 5/1991 | Whiting et al. | |
| 5,049,881 A | 9/1991 | Gibson et al. | |
| 5,051,745 A | 9/1991 | Katz | |
| 5,072,412 A | 12/1991 | Henderson, Jr. et al. | |
| 5,103,303 A | 4/1992 | Shoji et al. | |
| 5,115,479 A | 5/1992 | Murayama et al. | |
| 5,119,319 A | 6/1992 | Tanenbaum | |
| 5,126,739 A | 6/1992 | Whiting et al. | |
| 5,140,321 A | 8/1992 | Jung | |
| 5,155,485 A | 10/1992 | Sako et al. | |
| 5,161,015 A | 11/1992 | Citta et al. | |
| 5,164,727 A | 11/1992 | Zakhor et al. | |
| 5,231,697 A | 7/1993 | Yamada et al. | |
| 5,233,701 A | 8/1993 | Nakata et al. | |
| 5,241,625 A | 8/1993 | Epard et al. | |
| 5,269,003 A | 12/1993 | Roskowski et al. | |
| 5,305,440 A | 4/1994 | Morgan et al. | |
| 5,307,456 A | 4/1994 | MacKay | |
| 5,309,555 A | 5/1994 | Akins et al. | |
| 5,315,698 A | 5/1994 | Case et al. | |
| 5,317,732 A | 5/1994 | Gerlach, Jr. et al. | |
| 5,321,806 A | 6/1994 | Meinerth et al. | |
| 5,339,411 A | 8/1994 | Heaton, Jr. | |
| 5,345,588 A | 9/1994 | Greenwood et al. | |
| 5,347,578 A | 9/1994 | Duxbury et al. | |
| 5,351,129 A | 9/1994 | Lai | |
| 5,357,623 A | 10/1994 | Megory-Cohen et al. | |
| 5,359,712 A | 10/1994 | Cohen et al. | |
| 5,384,568 A | 1/1995 | Grinberg et al. | |
| 5,388,197 A | 2/1995 | Rayner | |
| 5,390,318 A | 2/1995 | Ramakrishnan et al. | |
| 5,394,531 A | 2/1995 | Smith | |
| 5,404,316 A | 4/1995 | Klingler et al. | |
| 5,406,279 A | 4/1995 | Anderson et al. | |
| 5,414,457 A | 5/1995 | Kadowaki et al. | |
| 5,414,704 A | 5/1995 | Spinney | |
| 5,426,752 A | 6/1995 | Takahasi et al. | |
| 5,432,871 A * | 7/1995 | Novik | 382/232 |
| 5,434,992 A | 7/1995 | Mattson | |
| 5,442,771 A | 8/1995 | Filepp et al. | |
| 5,455,576 A | 10/1995 | Clark, II et al. | |
| 5,461,711 A | 10/1995 | Wang et al. | |
| 5,469,540 A | 11/1995 | Powers, III et al. | |
| 5,473,742 A | 12/1995 | Polyakov et al. | |
| 5,485,460 A | 1/1996 | Schrier et al. | |
| 5,491,808 A | 2/1996 | Geist, Jr. | |
| 5,515,111 A | 5/1996 | Guedalia et al. | |
| 5,515,508 A | 5/1996 | Pettus et al. | |
| 5,521,597 A | 5/1996 | Dimitri | |
| 5,537,551 A | 7/1996 | Denenberg et al. | |
| 5,537,635 A | 7/1996 | Douglas | |
| 5,550,965 A | 8/1996 | Gabbe et al. | |
| 5,561,786 A | 10/1996 | Morse | |
| 5,566,288 A | 10/1996 | Koerhsen | |
| 5,572,206 A | 11/1996 | Miller et al. | |
| 5,574,845 A | 11/1996 | Benson et al. | |
| 5,579,469 A | 11/1996 | Pike | |
| 5,579,507 A | 11/1996 | Hosouchi et al. | |
| 5,588,138 A | 12/1996 | Bai et al. | |
| 5,651,136 A | 7/1997 | Denton et al. | |
| 5,652,854 A | 7/1997 | Wong | |
| 5,717,879 A | 2/1998 | Moran et al. | |
| 5,717,893 A | 2/1998 | Mattson | |
| 5,729,710 A | 3/1998 | Magee et al. | |
| 5,740,171 A | 4/1998 | Mazzola et al. | |
| 5,742,797 A | 4/1998 | Celi, Jr. et al. | |
| 5,757,795 A | 5/1998 | Schnell | |
| 5,757,925 A | 5/1998 | Faybishenko | |
| 5,761,734 A | 6/1998 | Pfeffer et al. | |
| 5,767,849 A | 6/1998 | Borgendale et al. | |
| 5,771,034 A | 6/1998 | Gibson | |
| 5,771,383 A | 6/1998 | Magee et al. | |
| 5,784,070 A | 7/1998 | Furuhashi et al. | |
| 5,802,281 A | 9/1998 | Clapp et al. | |
| 5,826,027 A | 10/1998 | Pedersen et al. | |
| 5,835,959 A | 11/1998 | McCool et al. | |
| 5,850,632 A | 12/1998 | Robertson et al. | |
| 5,864,678 A | 1/1999 | Riddle | |
| 5,864,711 A | 1/1999 | Mairs et al. | |
| 5,874,960 A | 2/1999 | Mairs et al. | |
| 5,877,757 A | 3/1999 | Baldwin et al. | |
| 5,886,707 A | 3/1999 | Berg | |
| 5,913,230 A | 6/1999 | Richardson | |
| 5,918,019 A | 6/1999 | Valencia | |
| 5,944,791 A | 8/1999 | Scherpbier | |
| 5,949,975 A | 9/1999 | Batty et al. | |
| 5,961,588 A | 10/1999 | Cooper et al. | |
| 5,968,132 A | 10/1999 | Tokunaga et al. | |
| 5,983,190 A | 11/1999 | Trower, II et al. | |
| 5,999,179 A | 12/1999 | Kekic et al. | |
| 5,999,950 A | 12/1999 | Krueger et al. | |
| 6,014,133 A | 1/2000 | Yamakado et al. | |
| 6,016,535 A | 1/2000 | Krantz et al. | |
| 6,023,749 A | 2/2000 | Richardson | |
| 6,034,689 A | 3/2000 | White et al. | |
| 6,052,120 A | 4/2000 | Nahi et al. | |
| 6,057,857 A | 5/2000 | Bloomfield | |
| 6,061,714 A | 5/2000 | Housel, III et al. | |
| 6,073,192 A | 6/2000 | Clapp et al. | |
| 6,081,623 A | 6/2000 | Bloomfield et al. | |
| 6,161,126 A | 12/2000 | Wies et al. | |
| 6,233,226 B1 * | 5/2001 | Gringeri et al. | 370/252 |
| 6,253,212 B1 | 6/2001 | Loaiza et al. | 1/1 |
| 6,363,511 B1 * | 3/2002 | Massoudi | 714/755 |
| 6,483,515 B1 | 11/2002 | Hanko | |
| 6,753,870 B2 * | 6/2004 | Deering et al. | 345/531 |
| 6,822,589 B1 * | 11/2004 | Dye et al. | 341/51 |
| 6,879,266 B1 * | 4/2005 | Dye et al. | 341/51 |
| 6,934,818 B2 * | 8/2005 | Okada | 711/154 |
| 7,028,025 B2 | 4/2006 | Collins | |
| 7,054,249 B2 * | 5/2006 | Okada | 369/53.11 |
| 7,127,525 B2 | 10/2006 | Coleman et al. | |
| 7,129,860 B2 * | 10/2006 | Alvarez et al. | 341/51 |
| 7,161,506 B2 * | 1/2007 | Fallon | 341/51 |
| 7,185,356 B2 * | 2/2007 | Fujinami | 725/90 |
| 7,190,284 B1 * | 3/2007 | Dye et al. | 341/51 |
| 7,289,684 B2 * | 10/2007 | Nakano et al. | 382/305 |
| 7,328,150 B2 * | 2/2008 | Chen et al. | 704/219 |
| 7,424,434 B2 * | 9/2008 | Chen et al. | 704/500 |
| 7,536,305 B2 * | 5/2009 | Chen et al. | 704/500 |
| 7,570,819 B2 * | 8/2009 | Sung et al. | 382/232 |
| 7,656,561 B2 * | 2/2010 | Molgaard et al. | 358/426.01 |
| 2001/0038642 A1 * | 11/2001 | Alvarez et al. | 370/477 |
| 2001/0054131 A1 * | 12/2001 | Alvarez et al. | 711/105 |
| 2002/0015249 A1 * | 2/2002 | Takayama et al. | 360/48 |
| 2002/0048450 A1 | 4/2002 | Zetts | |
| 2002/0097172 A1 * | 7/2002 | Fallon | 341/51 |
| 2003/0046432 A1 * | 3/2003 | Coleman et al. | 709/247 |
| 2003/0051005 A1 * | 3/2003 | Burch et al. | 709/219 |
| 2003/0084052 A1 | 5/2003 | Peterson | |
| 2003/0130855 A1 * | 7/2003 | Babu et al. | 704/500 |
| 2004/0056783 A1 * | 3/2004 | Fallon | 341/51 |
| 2004/0085228 A1 * | 5/2004 | Modha | 341/50 |
| 2005/0152606 A1 * | 7/2005 | Wood | 382/232 |

| | | | | |
|---|---|---|---|---|
| 2005/0267943 | A1* | 12/2005 | Castaldi et al. | 709/206 |
| 2005/0276496 | A1* | 12/2005 | Molgaard et al. | 382/244 |
| 2005/0286776 | A1* | 12/2005 | Bai et al. | 382/232 |
| 2006/0171596 | A1* | 8/2006 | Sung et al. | 382/232 |
| 2006/0195464 | A1* | 8/2006 | Guo | 707/101 |

FOREIGN PATENT DOCUMENTS

| | | |
|---|---|---|
| EP | 0375141 | 6/1990 |
| EP | 0375141 A | 6/1990 |
| EP | 0495612 | 7/1992 |
| EP | 0684582 | 11/1995 |
| EP | 0684583 | 11/1995 |
| EP | 0691628 | 1/1996 |
| EP | 0734144 | 9/1996 |
| EP | 0739140 | 10/1996 |
| EP | 0818753 | 1/1998 |
| EP | 0836145 | 4/1998 |
| EP | 1152594 | 11/2001 |
| EP | 1152594 A | 11/2001 |
| GB | 2136171 | 9/1984 |
| GB | 2323946 | 10/1998 |
| JP | 6-125363 | 5/1994 |
| WO | WO-94/03853 | 2/1994 |
| WO | WO-95/20863 | 8/1995 |
| WO | WO-97/18635 | 5/1997 |
| WO | WO-97/28623 | 8/1997 |
| WO | 01/92973 A | 12/2001 |
| WO | WO-01/92973 | 12/2001 |

OTHER PUBLICATIONS

Gilbert et al., "Globally progressive interactive web delivery", Infocom '99, 18th Annual Joint Conference of the IEEE Computer and Communication Societies, Proceedings IEEE New York, NY, USA, p. 1291-99, Mar. 21, 1999.
Anonymous: "Citrix Metaframe 1.8-Backgrounder", Citrix Documentation, Apr. 4, 1999.
Tierling, "Gezaehmtes Monster", CT Magazin Fuer Computer Technik, Heise Zeitschriften Verlag, Hanover, DE, 10: p. 226-28, 230, 23, 1998.
International Search Report, PCT/US/2006/008957, date of mailing Mar. 8, 2006.
Written Opinion of International Searching Authority, PCT/US2006/008957, date of mailing Mar. 8, 2006.
International Search Report, PCT/US2006/009204, date of mailing Dec. 7, 2006.
Written Opinion of International Searching Authority, PCT/US2006/009204, date of mailing Dec. 7, 2006.
Patents on data compression algorithms; available web site: www.iapr-ic.dimi.uniud.it; accessed on: Mar. 31, 1998; pp. 1-10.
Freeman, H., "A Scheme for the Efficient Encoding of Graphical Data for Communication and Information Processing", Proceedings of the Electronics Congress-Advanced in Electronics, Rassegna, IT, pp. 340-348, Mar. 24, 1969.
Freeman, H., "Computer Processing of Line-Drawings Images", ACM Computing Survey, New York, NY, US, vol. 6, No. 1, pp. 57-97, Mar. 1974.
European Search Report, Application No. EP03005806.9, 3 pages.
European Search Report, Application No. EP03005803.6, 3 pages.
European Search Report, Application No. EP03005804.4, 3 pages.
European Search Report, Application No. EP03005805.1, 3 pages.
"Word Based Data Compression Schemes" by Bar-Ness & Peckham, Copyright 1989, pp. 300-303, The Center for Communication and Signal Processing Research Department of Electrical Engineering, NJIT Netwark, NJ.
"The Norton Utilities Version 5.0 Disk Explorer", Copyright 1990 Peter Norton Computing, Inc.; pp. 28-54; Santa Monica, CA.
Crusty, "The Unofficial XviD FAQ", Web Page, Mar. 4, 2004, pp. 1-50, XP002338686, p. 8: paragraph 2-5, p. 31: paragraph 5-6.
De Alwis, "Screen Capturing and Playback Using VNC", Web Page (Online), Oct. 31, 2004, pp. 1-2, XP002389238, available at http://www.cs.ubc.ca/(bsd/vncrecording.html.
Reilly, "Today's Linux screen capture technology", NEWSFORGE, (Online), Aug. 17, 2004, pp. 1-3, XP002389239, available at: http://software.newsforge.com/article.

Sandklef, H, "Testing Applications with XNEE", Linux Journal (Online), 2004, pp. 1-6, vol. 2004, No. 117, ISSN:1075-3583, ACM Digital Library, available at: http://portal.acm.org/citation.cfm?id=959336.959341&coll=GUIDE&dl=ACM&idx=J508&part=periodical&WantType=periodical&title=Linux%20Journal.
Sandklef, H, "XNEE Manual", Manual Version 1.08D, Oct. 2003, available http://web.archive.org/web/20040627125613/www.gnu.org/software/xnee/www/manual/xnee.pdf.
Stanonik, R, "Recording/Playing Both Gaze Date and Compute Interaction", Nov. 30, 2000, available at: http://hci.ucsd.edu/eye/gaze.txt.
Stanonik, R, "Reversing the VNC Record File", Mar. 18, 2002, pp. 1-3, available at: http://www.archive.org/web/20060703115503/http://hci.ucsd.edu/eye/reversing.txt.
Zeldovich, et al., "Interactive performance measurement with VNCplay", USENIX 2005 Annual Technical Conference, (Online), Apr. 10, 2005, pp. 189-198, XP002381191, Ahaheim, CA, US, ISBN: 1-931971-28-5, available at: http://www.usenix.org/events/usenix05/tech/freenix/full_papers/zeldovich/zeldovich.pdf.
International Search Report to PCT/US2006/00887 (Jul. 24, 2006), 8 pages.
Written Opinion of teh Interantional Searching Authority to PCT/US2006/00887 (Jul. 24, 2006), 19 pages.
International Search Report to PCT/US2006/000888, (Aug. 31, 2006), 9 pages.
Written Opinion of the Interantional Search Authority to PCT/US2006/000888, (Aug. 31, 2006), 14 pages.
Pedersen, E.R., McCall, K., Moran, T.P., and Halasz, F.G., "Tivoli: An Electronic Whiteboard for Informal Workgroup Meetings," INTERCHI '93,Apr. 24-29, 1993, pp. 391-398.
Cruz, G. and Hill, R., "Capturing and Playing Multimedia Events with STREAMS", in Proceedings of ACM Multimedia '94, San Francisco, CA, Oct. 15-20, 1994, pp. 193-200.
Lamming, M.G., "Towards a Human Memory Prosthesis", Technical Report EPC-91-116, Copyright.RTM. Rank Xerox EuroPARC, Published in Proceedings of International Workshop Lecture Notes in Computer Science '91, Dagstuhl, Berlin, Jul. 1991.
Lamming, M.G., and Newman, W.M., "Activity-based Information Retrieval Technology in Support of Personal Memory," Technical Report EPC-91-103.1, Copyright.RTM. Rank Xerox EuroPARC 1991, pp. 1-16.
Rhyne, J.R., and Wolf, C.G., "Tools for Supporting the Collaborative Process," in Proceedings of the ACM Symposium on User Interface Software and Technology, Monterey, California, Nov. 15-18, 1992, pp. 161-170.
ScreenPlay Users Guide, Release 2.0, Copyright.COPYRGT. 1991-1993, RAD Technologies, Inc., Palo Alto, California, pp. 1-4, 9, 12-14, 30-37, and 44-66.
Wolf, C.G., Rhyne, J.R., and Briggs, L.K., "Communication and Information Retrieval with a Pen-based Meeting Support Tool," CSCW 92 Proceedings, Nov. 1992, pp. 322-329.
IBM Technical Disclosure Bulletin, "Remote Desktop Environments Reflected in Local Desktop Windows", vol. 36, No. 3, Mar. 1993, pp. 421-426.
IBM Technical Disclosure Bulletin, Mechanism for Finding Substitute Fonts in a Conference-Enabled X Windows Application, vol. 41, No. 01, Jan. 1998, pp. 137-142.
WebTV, "WebTV System Guide", http://developer.webtv.net/authoring/sysgde/sysgde.html, Sep. 13, 2000, pp. 1-12.
"Creating a Wider Bus Using Caching Techniques" by Citron & Rudolph; Institute of Computer Science, Hebrew University, Jerusalem Israel, Copyright 1995 IEEE.
Murray et al., "1.5 Move-to-Front Coding", 4 pp. 16-19, 1995.
"A New Source Coding Method Based on LZW Adopting the Least Recently Used Deletion Heuristic" by Hayashi, Kubo, Yamazoto & Sasase; pp. 190-193; May 19, 1993; University of Victoria.
Gilbert et al., "Globally progressive interactive web delivery," Infocom '99, 18th Annual Joint Conference of the IEEE Computer and Communication Societies, Proceedings IEEE New York, NY, USA, pp. 1291-1299, Mar. 21, 1999.

Non-Final Office Action dated Nov. 29, 2010 for U.S. Appl. No. 10/906,955 (13 pages).
Decision to Refuse a European Patent Application for 06738283.8 dated Mar. 9, 2011.
Official Notification for IL 185941 dated May 18, 2011.

Extended European Search Report on 10 184 683.0 dated Dec. 16, 2011.

* cited by examiner

METHOD AND APPARATUS FOR UPDATING A GRAPHICAL DISPLAY IN A DISTRIBUTED PROCESSING ENVIRONMENT

BACKGROUND OF THE INVENTION

Distributed computer systems utilize the technique of distributing application execution. More specifically, an application server locally executes an application program and provides the application output data to clients/network users who then display the results on a display screen that is locally-coupled to their local computer. Distributed systems can make the best use available computing resources, i.e., the more capable server performs compute and memory intensive application processing functions while, the client that may be less capable computationally but potentially more capable with respect to video performance, displays the output. In one type of distributed computing system, a user of the client views application output data on a local display during the execution of the application program and interacts with the application program via keyboard, mouse inputs, or other device inputs. The user's inputs correspond to requests to the application server to perform certain actions that affect the operation of the application program. The application server passes these requests to the application for further processing. The application server also intercepts application output data generated by the application program, and typically targeted to the operating system of the application server, and transmits all or part of the data to the client for display. From the perspective of the user, the application program seems to be executing locally even though it is actually being executed on a remote server and displayed locally.

There are various protocols that provide the above-described functionality. One example of such a protocol is the Remote Desktop Protocol ("RDP") distributed by Microsoft Corporation of Redmond, Wash. RDP is based on, and an extension of, the ITU T.120 family of protocols. RDP is a multiple-channel capable protocol that allows for separate virtual channels carrying device communication and presentation data from the application server, as well as encrypted client mouse and keyboard data. RDP uses its own video driver to render display output by constructing the rendering information into network packets using RDP protocol and sending them over the network to the client. On the client, RDP receives rendering data and interprets the packets into corresponding Microsoft Win32 graphics device interface (GDI) API calls. For the input path, client mouse and keyboard events are redirected from the client to the server.

Another protocol that provides similar functionality is the Independent Computing Architecture ("ICA") sold by Citrix Systems of Ft. Lauderdale, Fla. ICA is a protocol that enables separate screen updates and user input processing from the rest of an application's logic. All application logic executes on a first computing system and only screen updates, mouse movements, and keystrokes are transmitted during a session between the displaying computing system and the first computing system.

Distributed application processing systems have performed well for typical, office applications. However, certain applications that are graphically intense can adversely affect the performance of a distributed application processing system. Examples of graphically intense applications can include, but are not limited to, computer-aided drafting ("CAD") applications, video editing applications, and computer games. In these graphically-intense applications, display updates typically require a large amount of bandwidth because they are large, bitmap images. This problem is exacerbated when an executing application program sends multiple display updates in a short period of time, such as when a CAD/CAM program rotates a three-dimensional model of a device for the user to view. The delay in output due to the large size of the respective screen updates adversely affects user experience and interaction with the application program and makes use of the application program impractical in a distributed application processing environment.

BRIEF SUMMARY OF THE INVENTION

In one aspect, the invention features a method of updating a remote display unit. The method includes copying display information from a video buffer of a computing device executing an application remotely located from the display unit to generate a display update, calculating a size of the display update, and determining an amount of available bandwidth of a network connecting the computing device and the display unit. The method also includes calculating a time period required to communicate the display update from the computing device to the display unit, transmitting the display update to the display, and repeating one or more of the steps after the time period has elapsed.

In various embodiments, the method includes writing display information to the video buffer by the application during at least one of the steps. The method can also include generating at least one bounding rectangle indicative of a region of change of the video buffer as part of the display update, and tracking an amount of change to the video buffer to determine if a high update period exists.

In one embodiment, the method includes applying a lossy compression algorithm to the display update during a high update period to create a lossy display update, transmitting the lossy display update to the display, and transmitting a lossless display update to replace the lossy display update after the high update period.

In another aspect, the invention features a system for updating a display unit remotely located from a computing system. The system includes a video buffer, a driver, and a thread. The video buffer stores display data representing graphical output of an application program executing on the computer system. The driver determines a characteristic of a network between the computing system and the remote display unit and transmits a signal regarding network availability. The thread receives the signal and creates a display update for communication to the remote display that is responsive to the data stored in the video buffer.

In various embodiments, the signal regarding network availability includes a dynamically determined time period. The system can also have a timer module that communicates with the thread for executing the dynamically determined time period and signaling the thread to copy the local video buffer. The system can also include an update region in communication with video buffer for storing bounding rectangle information. An accumulator for tracking the amount of change made to the video buffer can also be included. Further, the system can include a compressor module that communicates with the driver to compress the display update before transmitting the display update to the remote display unit when the accumulator reaches a predetermined threshold.

In another aspect, the invention features a system for updating a display unit remotely located from a computing system. The system includes buffering means, driving means, and thread means. The buffering means stores display data representative of graphical output of an application program executing on the computer system. The driving means communicates with a network to determine a characteristic of the network and transmits a signal regarding network availability. The thread means receives the signal and creates a display update that is communicated to the remote display unit.

BRIEF DESCRIPTION OF THE DRAWINGS

The invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION OF THE INVENTION

The present invention features systems and methods of updating a display of a remote display unit. In one embodiment, the invention uses the current dynamic state of the bandwidth speed and the amount of pending data on the network to identify the next interval to send a display update. The interval is determined by the size of the update and the speed of the network. The display driver allows the application to update a local video buffer. The buffer contains the most up to date representation of the display screen. As updates occur, the display driver maintains a list of affected bounding rectangles that result from each update. When the network is ready, updates can be sent from the list of affected rectangles and the buffer. Double image buffering can be used. That is, the list of affected rectangle is copied and provided to the driver for transmission across the network. Copying the list of affected rectangles allows the application to issue many updates to the buffer while the slower process of transmitting the updates to the remote display occurs. A lossy image compression can be used on the updates sent to the remote display during periods of frequent updates. The affected regions of the updates that are lossy compressed and saved on a list. Once the period of frequent updates has stop, the list of lossy compressed regions can be retransmitted from the Local Video Buffer in a lossless way.

One advantage of the invention is the decoupling the application from the updates to the remote location. The application can make as many updates to the screen without forcing the updates down the slower network path. The updates that get sent to the remote location occur only when the network can handle the updates. This allows for many updates to occur by the application, but also allows only the most recent display image to be sent over the network. Thus, there is increased interactivity in the presentation of the display to the end-user.

Figure 1:
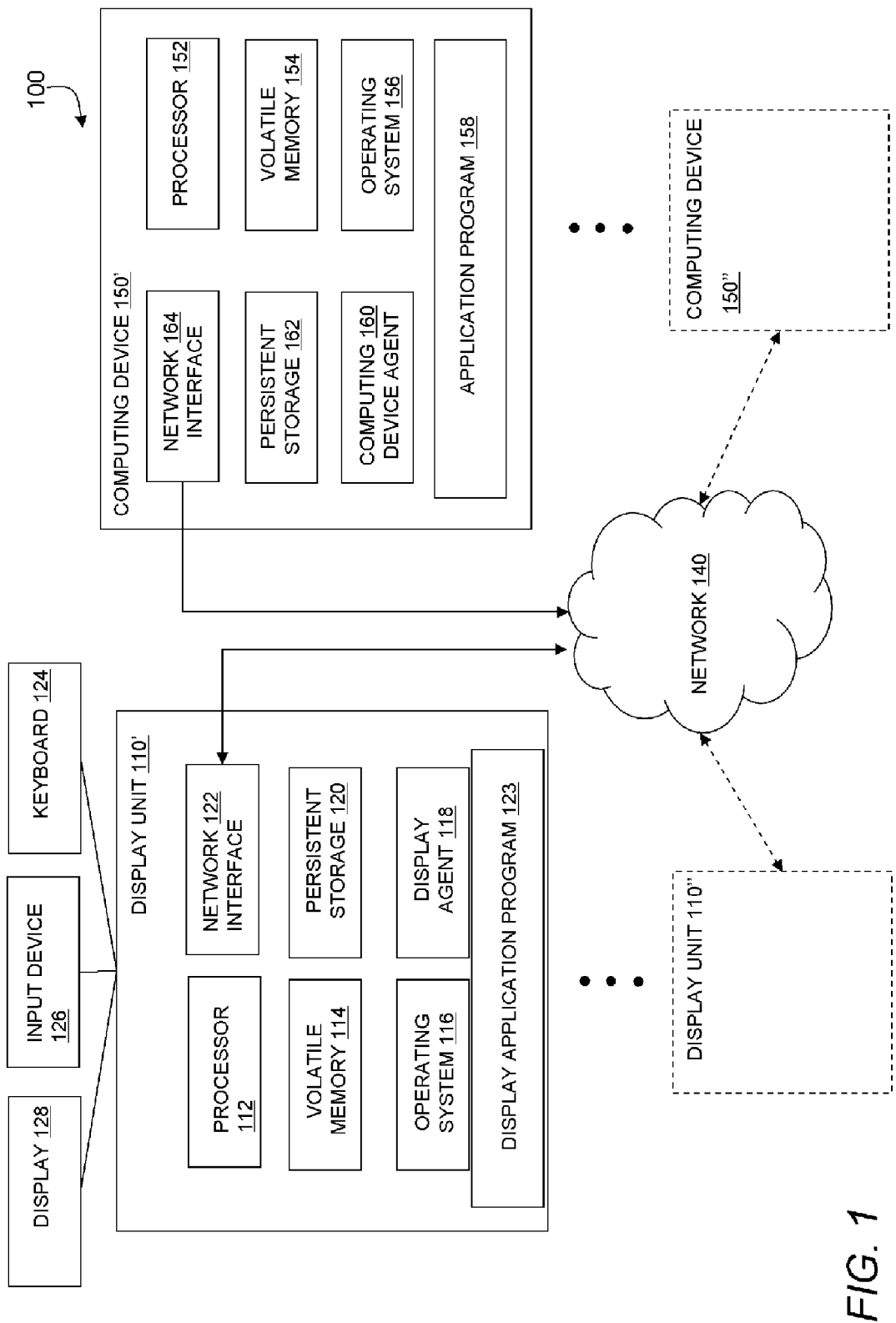
FIG. 1 is a block diagram of a distributed application processing system constructed according to principles of the present invention.

With reference to FIG. 1, a distributed application processing system 100 includes one or more remote display units 110', 110" (hereinafter each remote display unit or plurality of remote display units is generally referred to as 110) in communication with one or more computing devices 150', 150" (hereinafter each computing device or plurality of computing devices is generally referred to as 150) via a communications network 140. The network 140 can be a local-area network (LAN), a medium-area network (MAN), or a wide area network (WAN) such as the Internet or the World Wide Web. Users of the remote display unit 110 can be connected to the network 140 through a variety of connections including standard telephone lines, LAN or WAN links (e.g., T1, T3, 56 kb, X.25), broadband connections (e.g., ISDN, Frame Relay, ATM), and wireless connections (e.g., IEEE 802.11). The connections can be established using a variety of communication protocols (e.g., TCP/IP, IPX, SPX, NetBIOS, and direct asynchronous connections). In some particularly advantageous embodiments, the protocol used may be the Independent Computing Architecture protocol manufactured by Citrix Systems, Inc. of Fort Lauderdale, Fla. or the Remote Display Protocol manufactured by Microsoft Corporation of Redmond, Wash.

The bandwidth of the network 140 is one factor that affects the performance of the distributed application processing system 100. A network 140 having a larger bandwidth relative a second network typically can support transmission of more display data to the remote display unit 110. During operation of the distributed application processing system 100, the bandwidth of the network 140 fluctuates. As data is transmitted through the network 140 the amount of available bandwidth of the network is reduced. As display data is received by the remote display unit 110, the available bandwidth of the network 140 increases, assuming no additional data is placed on the network. One aspect of the invention monitors the available bandwidth of the network 140 and uses the measurement to dynamically determine when to send a display update frame to the remote display unit 110.

The remote display unit 110 typically includes a processor 112, a volatile memory 114 (e.g., RAM cache), an operating system 116, a display agent 118, a persistent storage memory 120, a network interface 122 (e.g., a network interface card), a display application program 123, a keyboard 124, at least one input device 126 (e.g., a mouse, trackball, space ball, light pen and tablet, stylus, and any other input device), and a display 128. Operating system 116 can include, without limitation, WINDOWS 3.x, WINDOWS 95, WINDOWS 98, WINDOWS NT 3.51, WINDOWS NT 4.0, WINDOWS 2000, WINDOWS CE, MAC/OS, Java, PALM OS, SYMBIAN OS, LINUX, SMARTPHONE OS, and UNIX. The display agent 118 receives commands and data from the computing device 150 and from a user (not shown) of the remote display unit 110. The client agent 118 uses the received information when interacting with other components of the remote display unit 110 (e.g., when directing the operating system 116 to output data onto the display 128). The display agent 118 also transmits requests and data to the computing device 150 in response to computing device-issued commands or user actions at the remote display unit 110.

The remote display unit 110 can be any personal computer (e.g., 286, 386, 486, Pentium, Pentium 11, Macintosh computer), Windows-based terminal, Network Computer, wireless device, information appliance, RISC Power PC, X-device, workstation, minicomputer, main frame computer, cellular telephone or other computing device that provides sufficient memory for executing the operating system 116 and the display application program 123. It should be understood that the display application program 123 can be integral with the operating system 116 or a stand-alone application. The display presentation program 123 uses commands and data sent to it by the computing device 150 across the network 140 to render a graphical output to the user of the display 128 of the display unit.

Similarly, the computing device 150 may include a processor 152, a volatile memory 154, an operating system 156, an application program 158, a computing device agent 160, persistent storage memory 162, and a network interface 164. The computing device agent 160 interfaces with the display agent 118 and other components of the computing device 150 to support the remote display and operability of the application program 158. In the distributed application processing system 100, execution of application programs occurs primarily on a computing device 150 and the user interface produced by application execution is transmitted over the network 140 to the remote display unit 110. The user provides inputs, such as keystrokes and mouse movements, at the display unit 110 which are transmitted over the network 140 to the computing device 150 to instruct the application programs to perform further tasks.

Each computing device 150 hosts one or more application programs 158 that can be accessed by the remote display units 110. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, application set managers, or computer-aided design and manufacturing applications, such as AUTOCAD sold by Autodesk of San Rafael, Calif., CATIA sold by Dassault Systemes of Suresnes Cedex, France, and PRO/ENGINEER sold by Parametric Technology Corporation of Needham, Mass.

Figure 2:
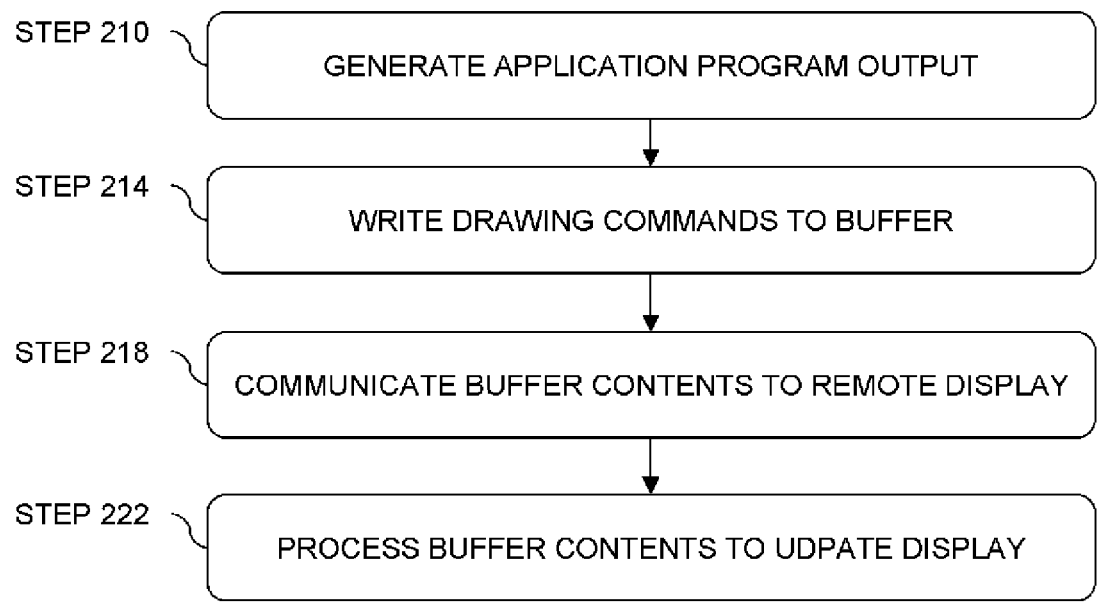
FIG. 2 is a flow chart illustrating an operational mode of the distributed application processing system of FIG. 1.

FIG. 2 provides an operational overview of the distributed application processing system shown in FIG. 1. The application program 158 generates output (step 210) responsive to user manipulation of the mouse 126 and keyboard 124 that is interpreted by the operating system 156, which in turn, issues drawing commands indicative of the graphical output of the application program 158. The drawing commands are written (step 214) to a buffer of the computing device 150. Periodically the contents of the buffer are communicated (step 218) to the remote display unit 110 and processed (step 222) by the display agent 118 of the remote display unit 110 to update the display 128. The computing device 150 communicates with the remote display unit 110 over a transport mechanism (part of the computing device agent 160). In one embodiment, the transport mechanism provides multiple virtual channels and one of the virtual channels provides a protocol for transmission of graphical screen data from the computing device 150 to the remote display unit 110.

Still referring to FIG. 2, and in greater detail, the application program 158 generates output (step 210) and issues drawing commands indicative of the graphical output of the application program 158. Examples of drawing commands can include, but are not limited to, raster operations, GDI commands provided by WINDOWS-based operating systems, and QUICKDRAW or QUARTZ commands provided by MAC/OS-based operating systems. In some embodiments, the drawing commands issued by the application program are "hooked," that is, the drawing commands are intercepted by code not associated with the application program and further processed as described below. In these embodiments, the drawing commands also may be provided to operating system 116 for processing in addition to being processed as described below. For easy of reference drawing command will be referred to as "GDI commands" throughout the remainder of the specification.

The drawing commands are written (step 214) to a buffer provided by the computing device 150. In some embodiments, lower-level commands, such as interface calls to a device driver associated with the graphical display of the computing device 150 are written to the buffer. In still other embodiments, both drawing commands and lower-level commands are stored in a buffer provided by the computing device 150. Drawing commands can be stored in the buffer at the same time that stored commands are transmitted to the remote display unit 110 to update the display provided by the remote display unit.

Periodically the contents of the buffer are communicated (step 218) to the remote display unit 110. How often the contents of the buffer are communicated to the remote display unit is a function of the amount of data presently pending on the network, as described in more detail below. The computing device 150 communicates with the remote display unit 110 over a transport mechanism (part of the computing device agent 160). In one embodiment, the transport mechanism provides multiple virtual channels and one of the virtual channels provides a protocol for transmission of graphical screen data from the computing device 150 to the remote display unit 110.

The display agent 118 of the remote display unit 110 processes the received buffer content (step 222) to update the display 128. In one embodiment, the display agent issues drawing commands to the operating system 116 of the remote display unit 110 that correspond to the drawing commands issued by the application program 158 of the computing device 150.

Figure 3:
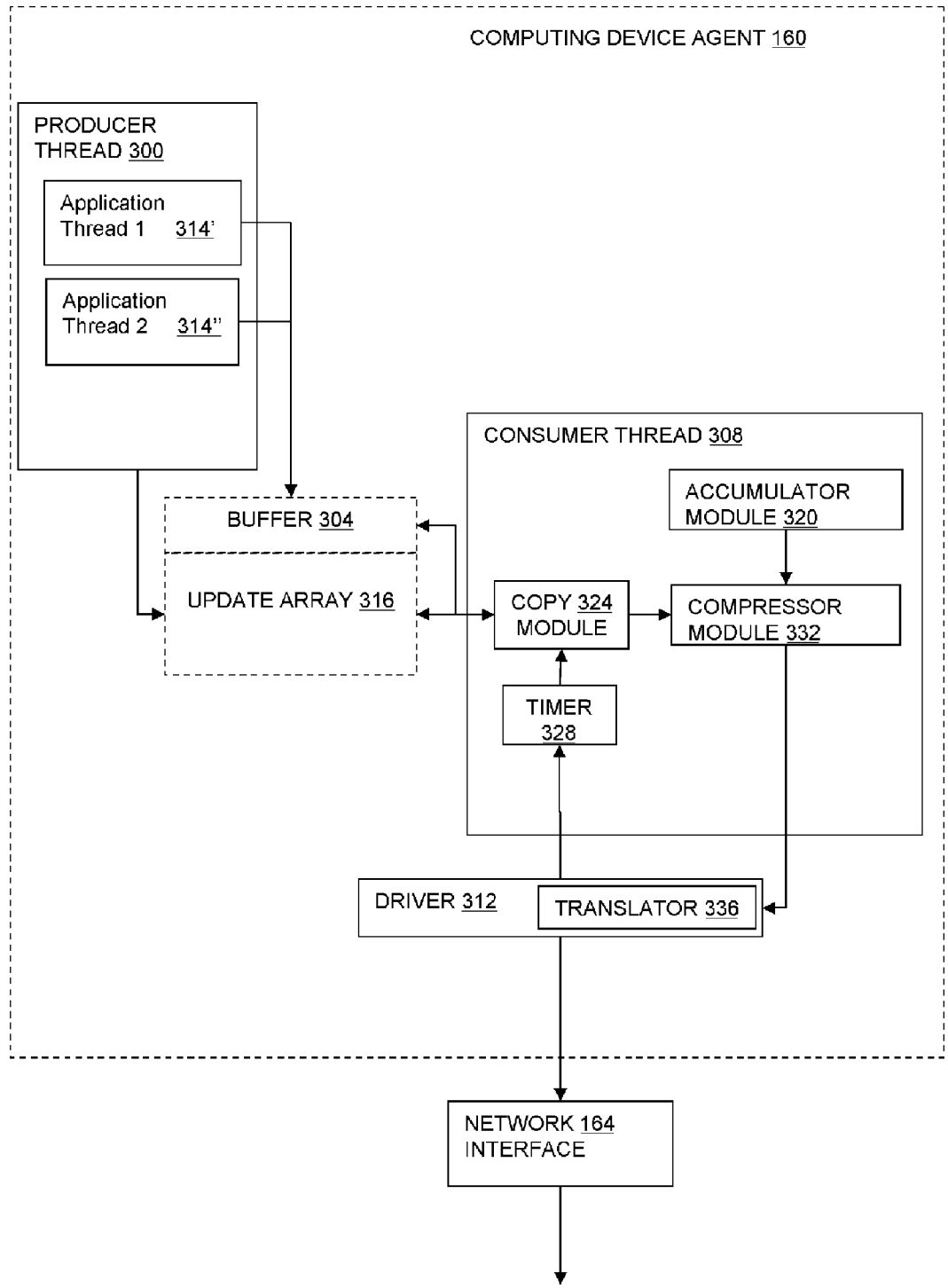
FIG. 3 is a block diagram of an embodiment of a computing unit agent of FIG. 1.

FIG. 3 is shows a conceptual block diagram of various components of the computing device agent 160. In one embodiment the computing device agent 160 includes a producer thread 300, a buffer 304, a consumer thread 308, and a driver 312. The producer thread 300 is in communication with the buffer 304. The consumer thread 308 is in communication with the buffer 304 and the driver 312.

The producer thread 300 includes one or more application threads 314', 314" (referred to generally as application thread 314) that issue drawing commands, such as GDI commands, which are processed and stored in the buffer 304 as graphical images. The drawing commands are typically issued to a graphics rendering engine, which in turn, renders the commands into the buffer 304. The output of the graphic rendering engine can be a complex bitmap or similar graphical representation. In essence, the buffer 304 functions as a "virtual" display for storing display image for later transmission to the remote display unit 110.

The producer thread 300 also tracks the changes to the buffer 304 by hooking the GDI commands prior to issuing them to the graphics rendering engine. The procedure thread 300 examines the GDI commands and generates one or more bounding rectangles that indicate areas of change in the bitmap of the buffer 304. The bounding rectangles are stored in an update array 316 that is in communication or integral with the buffer 304. The producer thread 300 can continually update the buffer 304 and the update array 316 during the operation of the consumer thread 308. Said another way, the producer thread 300 operates independently of the consumer thread 308.

In one embodiment, the buffer 304 is a dedicated and dynamically reconfigurable section of the volatile memory 154 or the persistent storage 162. As previously stated, a portion of the buffer 304 is reserved as an update array 316 for storing the bounding rectangles. In another embodiment, the buffer comprises a special-purpose memory, such as dual-port RAM, provided specifically to serve as the buffer.

As the number of bounding rectangles increases, various algorithms operate on the bounding rectangles to remove overlapping regions of change to prevent sending multiple updates for a single region in a single update frame. For example, if region X changes during a first write to the buffer 304, a bounding rectangle indicating the coordinates of the change region is stored in the update array 316. If a subsequent write to the buffer 304 results in a change to a region includes region X, the bounding rectangle related to region X is removed and replaced with the new bounding rectangle information.

The consumer thread 308 includes an accumulator module 320, a copy module 324, a timer module 328, and a compressor module 332. The accumulator module 320 is in communication with the buffer 304 and provides a running total of the amount of display data that has changed in the display image of the buffer 304. The total is used to trigger a mode of operation that included lossy compression, which is described in more detail below.

The copy module 324 is in communication with the buffer 304 and is capable of accessing the buffer 304 to copy the display image of the buffer and the bounding rectangles in the update array 316 to create a display update frame for transmission to the remote display unit 110.

The compressor module 328 is in communication with the copy module 324 and the accumulator module 320. The compressor module 328 provides a means to perform lossy compression on the display update frame to create a lossy display update frame. The running total is used to activate and deactivate the compressor module as required.

The timer 332 module is in communication with the driver 312 and the copy module 324. The function of the timer module 332 is to trigger a copy operation from the buffer 304 after dynamically determined time period. The length of the dynamically determined time period of the timer module 332 is dependent on the available bandwidth of the network 140 and the size of a respective display frame update. By dynamically determining the time period, the invention provides a "just-in-time" delivery of the display update frame to remote display unit 110.

The driver 312 includes a translator module 336 for formatting the display update frame according to the communication protocol of the distributed application processing system 100. The driver 312 also dynamically determines the time period used by the timer module 328. In one embodiment, the driver module 312 monitors a round-trip time for the display update frame. Other methods of determining the dynamically determined time period can also be used. For example, the number of drawing operations that were issued by the application thread 314 can be used.

Figure 4:
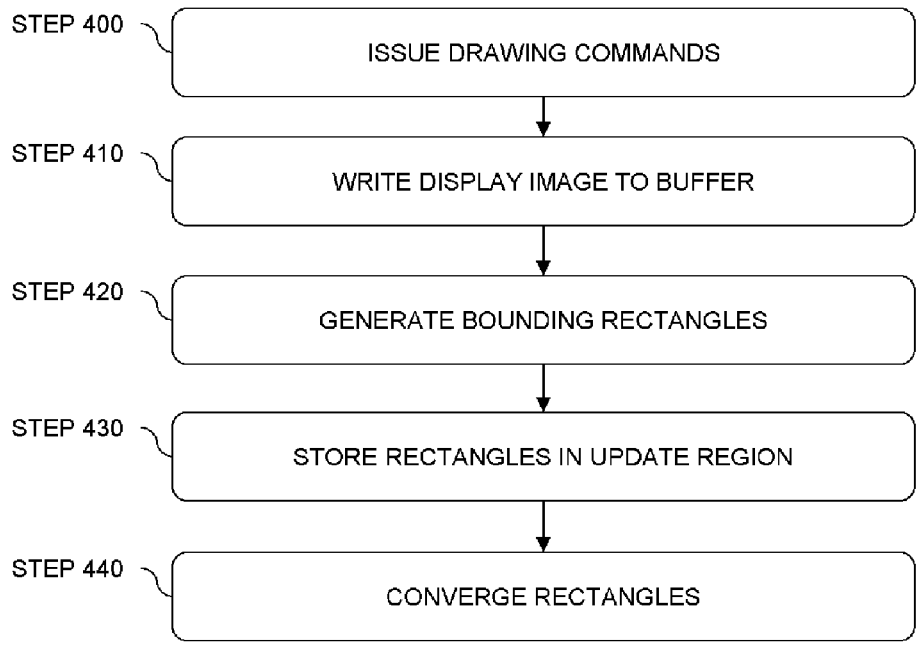
FIG. 4 is a flow chart of a method of operation of the producer thread of FIG. 3.

Referring now to FIG. 4, the operation of the producer thread 300 is described. As a general overview, the producer thread 300 issues (step 400) drawing commands; writes (step 410) a display image to the buffer 304; generates (step 420) the bounding rectangles; stores (step 430) the bounding rectangles in the update display region 316; and converges (step 440) the bounding rectangles.

In more detail, the application program threads 314 issue (step 400) GDI drawing commands to the graphical rendering engine. Write commands from the graphical rendering engine generate (step 410) a display image that is stored in the buffer 304. Subsequent writes to the buffer 304 result in changes to the display image.

The producer thread 300 generates (step 420) one or more bounding rectangles that identify an area of the display image that has changed since the last write to the buffer 304. In one embodiment, the GDI commands that are issued to the graphics rendering engine are hooked before they are passed through to the graphics rendering engine. Subsequent GDI commands are compared against previously issued commands to determine which areas of the image have changed.

The update array 316 stores (step 430) the bounding rectangles. Prior to writing a new bounding rectangle to the update array 316, the producer thread 300 determines if any of the existing rectangles in the update array 316 intersect or overlaps with the new bounding rectangle. One method know to those of ordinary skill in the art is the use of rectangle collision detection algorithms.

If intersection or overlap exists, the bounding rectangles are converged (step 440). As user herein, converging refers to replacing, combining, or segmenting, an existing rectangle with the new rectangle. In some embodiments, if the new bounding rectangle describes a region of change that overlaps an existing bounding rectangle, the new bounding rectangle is written to the update region 316 and the existing bounding rectangle is removed.

Figure 5:
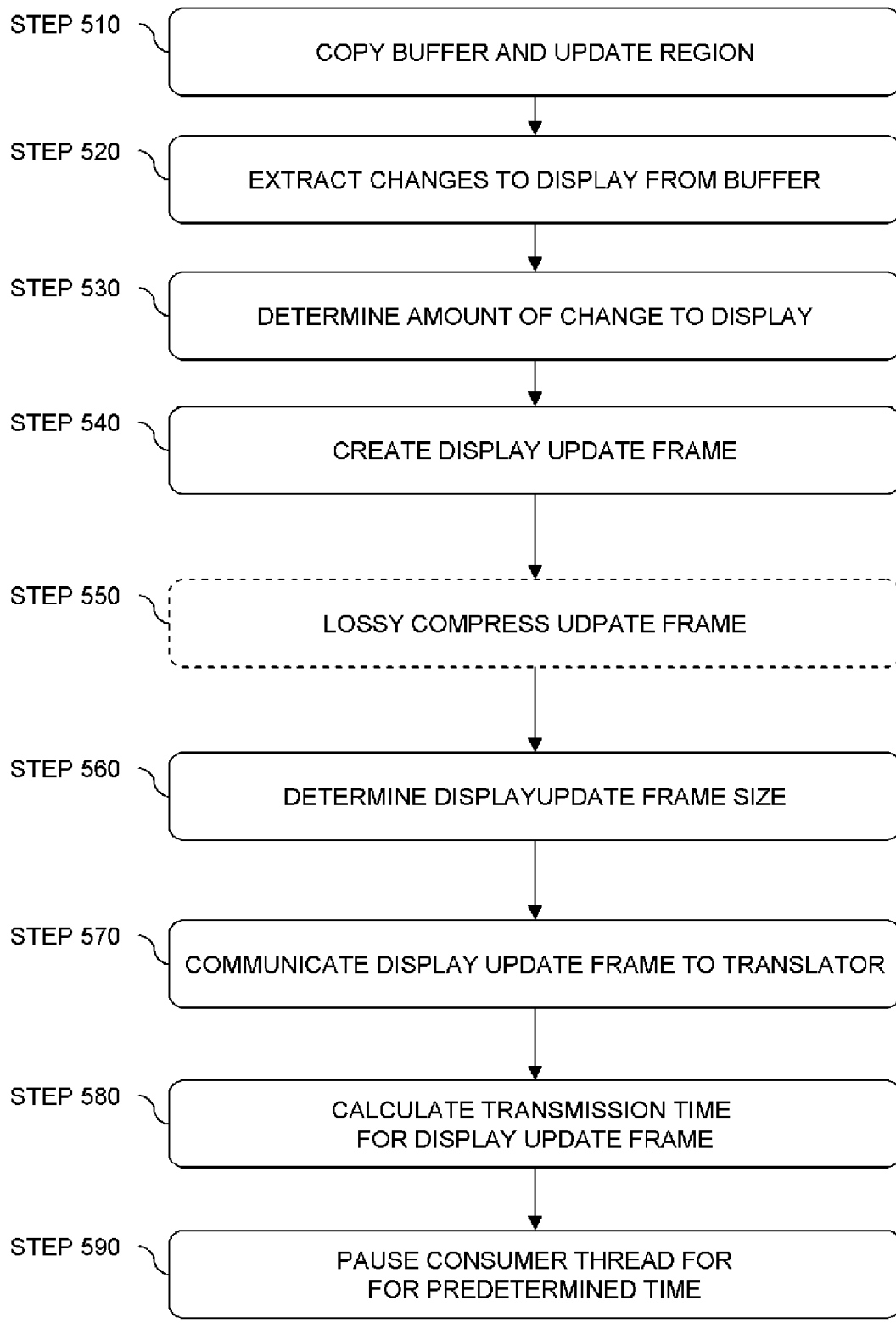
FIG. 5 is a flow chart of a method of operation of the consumer thread of FIG. 3.

With reference to FIG. 5, the operation of the consumer thread 308 is described. Generally, the consumer thread 308 periodically generates and transmits the display update frame to the remote display unit 110 by copying (step 510) the contents of the display buffer 304 and update array 316; extracting (step 520) the changes to the display; determine (step 530) the amount of change to the display; creating (step 540) the display update frame; optionally the display update frame is lossy compressed (step 550); calculating (step 560) the size of the display update frame; communicating (step 570) the display update frame to the translator; calculating (step 580) the time required to transmit the update to the remote display unit 110; and pausing (step 590) operation of the consumer thread for a predetermined time.

In more detail and with continued reference to FIG. 5, the copy module 324, upon the expiration of the dynamically determined time period, copies (step 510) the contents of the buffer 304 and the update array 316. In other words, the consumer thread 308 takes a "snap shot" of the buffer 304 and the update array 316. Once the snap shot is taken, the application programming threads 316 continually write to the buffer 304 and display update region 316 to make further changes thereto independent of the operation of the consumer thread 308. Therefore, the buffer 304 has the most up-to-date display information.

From the snap shot, the consumer thread extracts (step 520) the changes in the display from the buffer 304 contents, which is typically a complex bitmap image. In one embodiment, the bounding rectangles are used to determine which areas of the display have changed. In another embodiment, the previous update display frame is saved and compared to the present update display frame using a logic operation such as an exclusive or (XOR).

The amount of change in the display image is determined (step 530) using any number of various methods known to those of ordinary skill in the art and communicated to the accumulator module to update the running total. In one embodiment, the size of the affected area is calculated. In one embodiment, the amount of change information is transmitted to the accumulator module 320, which updates the running total.

In one embodiment, the running count is used to determine if a high update period is occurring. If no updates to the buffer 304 occur, the accumulator module 326 decreases the running count by a predetermined amount. If the running count exceeds a predetermined threshold, each display update frame is subjected to a lossy compression technique before transmission to the remote display. Determining the end of the high update period can be accomplished in various ways. In one embodiment, if no changes to the buffer 304 and update array 316 occur for a predetermined period of time (e.g., 1 second) the consumer thread 308 exits the lossy compression mode and returns to transmitting lossless compression display frame updates to the remote display unit 110.

After determining the amount of change in the display, the consumer thread 308 creates the display update frame (step 540). If so required, the consumer thread 308 applies (step 550) a lossy compression technique to the update display frame to create a lossy update display frame for transmission to the remote display unit 110. In one embodiment, a photographic codec is used (e.g., JPEG compression using arithmetic encoding). While this type of encoding is more processor intensive, it can decrease the size of the display update frame by as much as thirty percent relative to other codecs (e.g., JPEG compression using optimized Huffman encoding). Before applying the lossy compression algorithm, the consumer thread 308 caches the display update frames prior to applying the lossy compression algorithm. The cached display update frames are subsequently forwarded to the remote display unit once the high update period has ended.

Once the display update frame is constructed, the consumer thread 308 determines (step 560) the size of the display update frame. The display update frame is communicated (step 570) to the translator module 336 of the driver 312. In one embodiment, the translator module 336 converts the display update frame according the transmission protocol of the distributed application processing system 100. As part of the conversation, the size of the display update frame is used to determine the time required to send the display update frame to the remote display unit 110.

In one embodiment, the driver module 312 calculates (step 580) the estimated transmission time by dividing the size of the display update frame by the available bandwidth of the network 140. This calculation results in the dynamically determined time period used by the timer 332 of the consumer thread 308. The translated display update frame is send to the network interface 164 and transmitted to the remote display unit 110.

After transmitting the display update frame, the consumer thread remains inactive (step 590) or pauses until the expiration of the dynamically determined time period. After the expiration of the dynamically determined time period, the consumer thread takes another snap shot of the buffer 304 and update array 316 and performs the same process.

Figure 6:
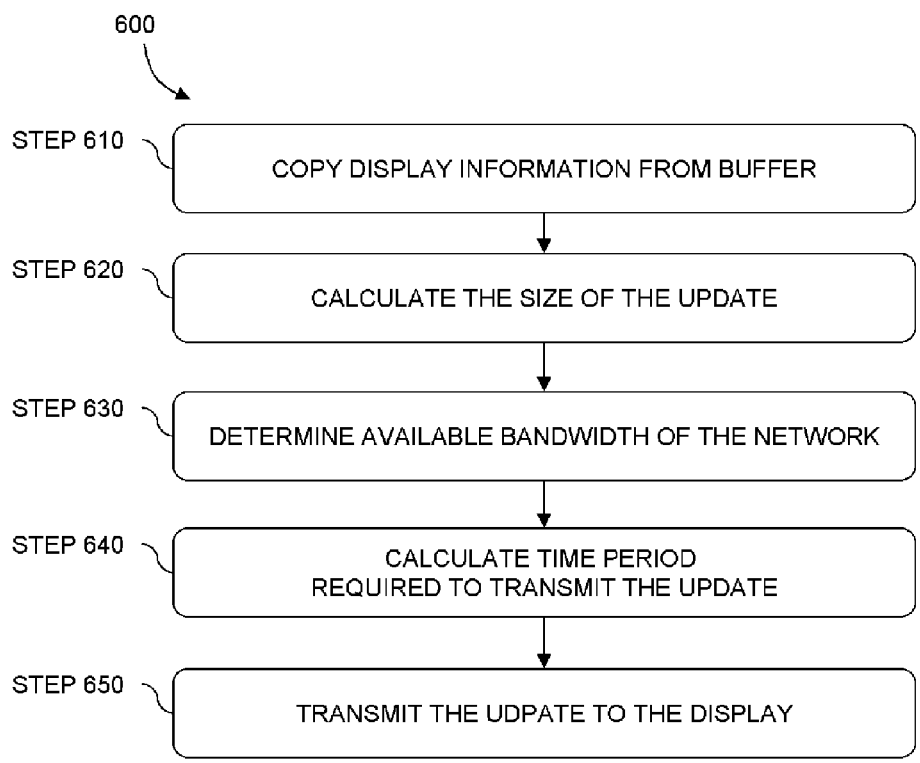
FIG. 6 is a flow chart of an embodiment of a method providing updates to a remote display according to principles of the invention.

In summary and referring to FIG. 6, a method 600 for transmitting screen updates to the remote display unit 110 includes copying display information from a video buffer of a computing device executing an application remotely located from the display unit to generate a display update (step 610); calculating a size of the display update (step 620); determining an amount of available bandwidth of a network connecting the computing device and the display unit (step 630); calculating a time period required to communicate the display update from the computing device to the display unit (step 640); transmitting the display update to the display (step 650); and repeating the method when the calculated time period has elapsed (step 660).

Although the present invention has been described with reference to specific details, it is not intended that such details should be regarded as limitations upon the scope of the invention, except as and to the extent that they are included in the accompanying claims.

What is claimed is:

1. A method of updating a remote display unit comprising:
   (a) copying, by a copy module executing on a computing device, display information from a buffer to generate a display update, the display information generated by an application executing on the computing device;
   (b) calculating, by an accumulator module executing on the computing device, a size of the display update;
   (c) determining, by a driver executing on the computing device, an amount of available bandwidth of a network connecting the computing device and the remote display unit;
   (d) calculating, by the driver, a time period required to communicate the display update from the computing device to the remote display unit, the calculated time period based in part on the determined amount of available bandwidth;
   (e) selecting one of a lossy compression algorithm and a lossless compression algorithm to compress the generated display update, the selection responsive to the amount of change in the display update;
   (f) applying, by a compressor module executing on the computing device, one of a lossy compression algorithm and a lossless compression algorithm, the lossy compression algorithm applied responsive to determining a running count corresponding to the amount of change in the display update exceeds a predetermined threshold to create a lossy compressed display update during a high update period, and the lossless compression algorithm applied to create a lossless display update;
   (g) transmitting, by a computing device agent executing on the computing device, the lossy compressed display update to the remote display unit;
   (h) transmitting, by the computing device agent, the lossless display update during a period of time that is not a high update period;
   (i) triggering, by a timer module executing on the computing device, the copy module to copy the display information from the buffer after the calculated time period elapses; and
   (j) repeating steps (b)-(i).

2. The method of claim 1 further comprising writing, by a thread executing on the computing device, display information to the buffer.

3. The method of claim 1 further comprising generating, by a thread executing on the computing device, at least one bounding rectangle indicative of a region of change of the buffer as part of the display update.

4. The method of claim 1 further comprising tracking, by the accumulator module, an amount of change to the buffer to determine if a period of time is a high update period.

5. A system for updating a display unit remotely located from a computing device comprising:
   a buffer stored in a memory element provided by a computing device, the buffer storing display data representing graphical output of an application program executing on the computing device;
   a copy module executed by a processor on the computing device to copy the display data from the buffer to generate a display update;
   an accumulator module executed by the processor on the computing device to calculate a size of the display update;
   a driver executed by the processor on the computing device to determine an amount of available bandwidth of a network between the computing device and the remote display unit, and to calculate a time period required to communicate the display update from the computing device to the display unit, the calculated time period based in part on the amount of available bandwidth;

a computing device agent executed by the processor on the computing device to select one of a lossy compression algorithm, and a lossless compression algorithm responsive to a determination of an amount of change in the display update, to compress the display update using the selected compression algorithm, applying, by a compressor module executing on the computing device and responsive to determining a running count corresponding to the amount of change in the display update exceeding a predetermined threshold, a lossy compression algorithm to the display update during a high update period to create a lossy compressed display update and a lossless compression algorithm to the display update to create a lossless compressed display update and to transmit to the remote display unit the lossy compressed display update during the high update period and the lossless compressed display update during a period that is not a high update period; and a timer module executed by the processor on the computing device to trigger the copy module to copy the display data from the buffer after the calculated time period elapses.

6. The system of claim 5 further comprising a thread executing on the computing machine to write display data to the buffer.

7. The system of claim 5 further comprising a thread executing on the computing machine to generate at least one bounding rectangle indicative of a region of change of the buffer as part of the display update.

8. The system of claim 5 wherein the accumulator module further tracks the amount of change made to the video buffer to determine if a period of time is a high update period.

9. The system of claim 5 further comprising a compressor executing on the computing machine to compress the display update into the lossy compressed display update before the computing device agent, responsive to the accumulator module reaching a predetermined threshold, transmits the lossy compressed display update to the remote display unit.

10. A system for updating a remote display unit, the system comprising:

copier means executing on a processor for copying display information from a buffer to generate a display update, the display information generated by an application executing on a computing device;

calculator means executing on a processor for calculating a size of the display update;

driver means executing on a processor for determining an amount of available bandwidth of a network connecting the computing device and the remote display unit;

calculator means executing on a processor for calculating a time period required to communicate the display update from the computing device to the remote display unit, the calculated time period based in part on the determined amount of available bandwidth;

selection means executing on a processor for selecting one of a lossy compression algorithm and a lossless compression algorithm to compress the generated display update, the selection responsive to the amount of change in the display update;

applying means executing on a processor for applying, by a compressor module executing on the computing device, one of a lossy compression algorithm and a lossless compression algorithm, the lossy compression algorithm applied responsive to determining a running count corresponding to the amount of change in the display update exceeds a predetermined threshold to create a lossy compressed display update during a high update period, and the lossless compression algorithm applied to create a lossless display update;

transmission means executing on a processor for transmitting to the remote display unit the lossy compressed display update during a high update period and the lossless compressed display update during a period that is not a high update period; and driver means executing on a processor for triggering a copy module to copy the display information from the buffer after the calculated time period elapses.

11. The system of claim 10 further comprising display means for writing display information to the buffer.

12. The system of claim 10 further comprising means for generating at least one bounding rectangle indicative of a region of change of the buffer as part of the display update.

13. The system of claim 10 further comprising tracking means for tracking an amount of change to the buffer to determine if a period of time is a high update period.

14. The system of claim 10 further comprising compression means for applying a lossless compression algorithm to the display update, during a period of time that is not a high update period, to create a lossless display update.

* * * * *